United States Patent [19]

Crane

[11] Patent Number: 5,079,024

[45] Date of Patent: Jan. 7, 1992

[54] METHOD OF MANUFACTURE OF A NON-FAT CREAM CHEESE PRODUCT

[75] Inventor: Lori A. Crane, Mt. Prospect, Ill.

[73] Assignee: Kraft General Foods, Inc., Glenview, Ill.

[21] Appl. No.: 588,083

[22] Filed: Sep. 25, 1990

[51] Int. Cl.⁵ .............................................. A23L 1/05
[52] U.S. Cl. ................................... 426/573; 426/521; 426/522; 426/582
[58] Field of Search ............... 426/573, 582, 580, 583, 426/588, 654, 519, 520, 521, 522

[56] References Cited

U.S. PATENT DOCUMENTS 4,724,152  2/1988  Baker et al. ................. 426/582 X
4,968,512  11/1990  Kharrazi ...................... 426/582 X

OTHER PUBLICATIONS

Tamime, A. Y. and Robinson, A. K., Yoghurt Science and Technology, 1985, pp. 17–40, Pergamon Press, Oxford.

Fennema, O. R., Food Chemistry, 1985, pp. 678–679, Mercel Dekker, Inc., New York.

*Primary Examiner*—Marianne Cintins
*Assistant Examiner*—Leslie Wood
*Attorney, Agent, or Firm*—Fitch, Even, Tabin & Flannery

[57] ABSTRACT

In the method of the present invention for making a non-fat cream cheese product, a source of concentrated skim milk is introduced into a first mixer provided with agitation means. The skim milk is agitated as the skim milk is heated in the first mixer to a first predetermined elevated temperature. An emulsifier salt is added to the skim milk in the first mixer. After reaching the first predetermined elevated temperature, the skim milk is transferred to a second mixer provided with agitation means. A first gum is added to the heated skim milk in the second mixer to provide a thickened skim milk. The thickened skim milk is homogenized in a first homogenizing step. The homogenized skim milk is transferred to a third mixer provided with agitation means. A bulking agent and a second gum are added to the homogenized, thickened skim milk in the third mixer. The homogenized, thickened skim milk is agitated in the third mixer as the skim milk is heated to a second predetermined temperature to provide a non-fat cream cheese precursor. The non-fat cream cheese precursor is homogenized in a second homogenizing step to provide a non-fat cream cheese type product.

82 Claims, 1 Drawing Sheet

METHOD OF MANUFACTURE OF A NON-FAT CREAM CHEESE PRODUCT

FIELD OF THE INVENTION

The present invention is directed to a non-fat cream cheese product and to a method for manufacture thereof. Generally, the method includes the steps of combining a concentrated skim milk source with an emulsifying salt, a bulking agent and various gums in a series of steps to produce a non-fat cream cheese product that resembles a reduced fat or full fat cream cheese in texture, taste and mouthfeel.

BACKGROUND OF THE INVENTION

Cream cheese is a soft, mild acid-coagulated uncured cheese made of cream from a mixture of cream and milk. Cream cheese is stored under refrigeration conditions and the body of cream cheese is smooth and butter-like. The texture and body of cream cheese at refrigeration temperatures is such that the cream cheese can be sliced and spread. In making cream cheese, sweet whole milk and/or skim milk and sweet cream are blended in pre-selected proportions to form a cream cheese mix. The cream cheese mix normally has a butterfat content of from about 10% to about 14%. After processing, the finished cream cheese has a butterfat content of from about 33% to about 35% by weight.

The cream cheese mix is pasteurized and homogenized after which it is cooled, usually to a temperature between 62° F. and 92° F. and is then inoculated with a lactic acid culture. Rennet may be used to aid the coagulation of the mix. The mix is held at the inoculation temperature until it has ripened and a coagulum is formed. The acidity of the coagulum is from about 0.6% to about 0.9% (calculated as percent equivalent lactic acid).

After the desired acidity is obtained, the curd is separated from the whey and is thereafter packaged. One well known process for making cream cheese and separating cream cheese curd from whey includes a mechanical separation of the curd. This process is disclosed in U.S. Pat. No. 2,387,276 to Link. In accordance with the method of the Link patent, after the mix is ripened to form a coagulum, the coagulum is heated to an elevated temperature to break the viscosity of the mix. Thereafter, the heated mix is centrifuged at the elevated temperature to separate the curd from the whey.

There have been many efforts to provide a cream cheese type product which has the texture, smoothness and organoleptic properties of cream cheese, but with reduced levels of fat. With increasing consumer awareness, the focal point is on reducing fat and calorie consumption. Low fat, low calorie foods which look and taste similar to their full fat, higher calorie counterparts are eagerly sought by the consumer. Researchers in the food industry have concentrated on developing food products which are nutritious and palatable, containing substantially reduced levels of high calorie, fat containing ingredients. This is particularly true in the dairy industry where low calorie, low-fat products such as skim milk, yogurt and reduced fat ice cream have been successfully marketed.

The high fat levels in some dairy products, such as cream cheese which has a fat content of at least about 33%, have been thought to be necessary to maintain a desirable creamy mouthfeel and to avoid the grainy texture associated with prior attempts at producing low fat cream cheese products.

Many efforts have been made to develop imitation cream cheese products which contain reduced fat levels. Examples of such efforts are disclosed in U.S. Pat. No. 2,161,159 to Lundstedt, et al. and U.S. Pat. No. 3,929,892 to Hynes, et al. However, the fat content of the cream cheese products produced by the methods of these patents still exceed about 10% fat. It would be desirable to reduce the fat content well below 10%. In particular, it would be highly desirable to provide a non-fat cream cheese product.

More recently, methods have been developed for making very low butterfat content imitation cream cheese products having low calorie contents which are intended for diet conscious consumers. U.S. Pat. No. 4,244,983 to Baker and U.S. Pat. No. 4,379,175 to Baker disclose imitation cream cheese products and a method for their manufacture having butterfat content of less than about 5%, preferably less than about 2% and which have about 60 calories per serving. However, as admitted by the inventor of these patents, in U.S. Pat. No. 4,724,152 to Baker, that, while the very low butterfat content of these products is desirable, the products do not closely duplicate the creamy and full-bodied consistency of full fat cream cheese.

U.S. Pat. No. 4,724,152 to Baker describes a method for making a low fat cream cheese product. The method includes the steps of admixing milk, a fat-containing carrier and non-fat dry milk solids to form a dressing mixture. The dressing mixture is pasteurized and homogenized and is thereafter heated to a temperature in the range of from about 145° to about 195° F., preferably 165° to 190° F., with constant agitation. A stabilizer is admixed into the mixture. Thereafter, while maintaining the temperature of the mixture in a range of 150° to 175° F., soft unripened cultured cheese curd, such as cottage or baker's cheese curd is added to the stabilizer-containing dressing mix. The admixture is pumped to a homogenizer where it is homogenized under conventional elevated pressure conditions of 500 to 5000 psig, preferably 1500 to 3000 psig. Following homogenization, the imitation cream cheese product, at temperatures of at least 40° F., is packaged into convenient packages.

While the '152 Baker patent provides a cream cheese product with reduced fat, i.e., a fat level in the range of 2 to 9% by weight, the Baker patent does not provide a non-fat cream cheese product.

Accordingly, it is a principal object of the present invention to provide a non-fat cream cheese type product, having the appearance, taste, consistency and texture of fat-containing cream cheese.

It is another object to provide a method for making an imitation cream cheese product which has substantially no fat and which is adapted to large scale commercial operations.

These and other objects of the invention will become more apparent from the following detailed description.

SUMMARY OF THE INVENTION

Figure 1:
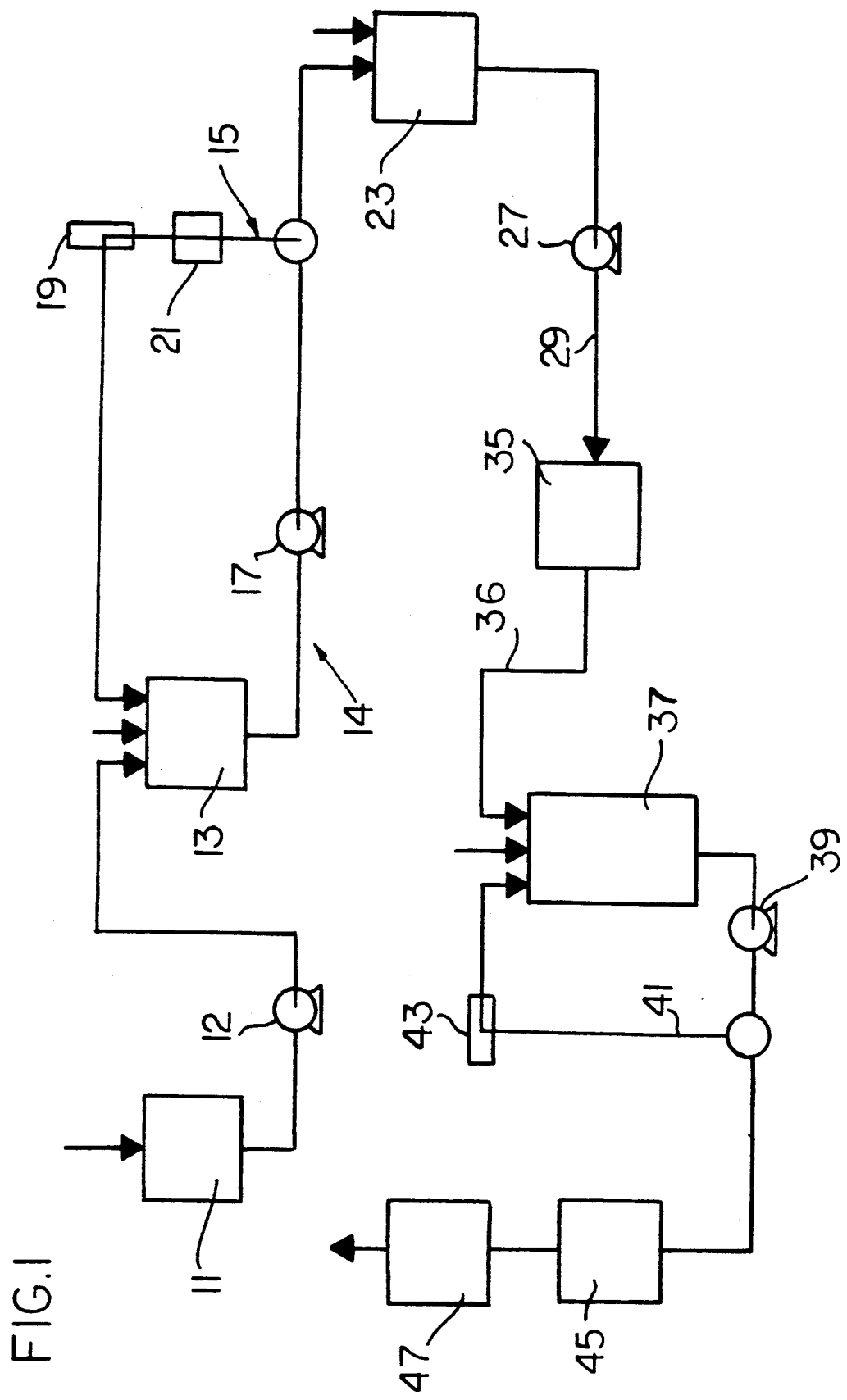
FIG. 1 is a schematic diagram depicting the steps in the method of the invention for producing a non-fat cream cheese.

In the method of the present invention for making a non-fat cream cheese product, a source of concentrated skim milk is introduced into a first mixer provided with agitation means. The skim milk is agitated as the skim milk is heated in the first mixer to a first predetermined elevated temperature. An emulsifier salt is added to the skim milk in the first mixer. After reaching the first predetermined elevated temperature, the skim milk is transferred to a second mixer provided with agitation means. A first gum is added to the heated skim milk in the second mixer to provide a thickened skim milk. The thickened skim milk is homogenized in a first homogenizing step. The homogenized skim milk is transferred to a third mixer provided with agitation means. A bulking agent and a second gum are added to the homogenized, thickened skim milk in the third mixer. The homogenized, thickened skim milk is agitated in the third mixer as the skim milk is heated to a second predetermined temperature to provide a non-fat cream cheese precursor. The non-fat cream cheese precursor is homogenized in a second homogenizing step to provide a non-fat cream cheese type product.

DETAILED DESCRIPTION OF THE INVENTION

Generally, in accordance with the invention, a source of concentrated skim milk is first provided. The concentrated skim milk preferably has a non-fat milk solids content of from about 20 to about 30%. All percentages used herein are by weight, dry basis and all temperatures are in °F. unless otherwise indicated. The source of concentrated skim milk can be from a variety of operations. The concentrated skim milk can be produced by ultrafiltration treatment to provide a skim milk retentate. The concentrated skim milk source can also be provided by dry cottage cheese curd. Dry cultured cottage cheese curd is a well known dairy product, which is a drained, uncreamed skim milk cheese curd made by inoculating skim milk with culture and allowing the product to coagulate. Dry cottage cheese curd may also be made by a direct acidification method. Generally, dry cottage cheese curd comprises about 20% to 25% by weight non-fat milk solids and 75% to 85% by weight water. When used herein, the term "dry cottage cheese curd" refers to a soft cheese curd such as cottage cheese or baker's cheese curd product having the above solids and moisture characteristics. Concentrated skim milk may also be produced by evaporation or by reconstitution of dried skim milk. These latter sources of concentrated skim milk are less preferred.

The skim milk used to provide the concentrated skim milk source may be subjected to well known heat treatment conditions to co-precipitate the serum proteins with the casein during preparation of the dry cottage cheese curd. Such conditions are taught in U.S. Pat. No. 3,039,879 to Vakaleris.

In an important embodiment of the present invention, a mixture of fermented skim milk retentate from an ultrafiltration process and dry cottage cheese curd are used to provide the concentrated skim milk source. The mixture preferably includes from about 5% to about 95% of the retentate.

Prior to use in the method of the present invention, a skim milk retentate produced by ultrafiltration is preferably fermented to reduce the pH of the skim milk retentate. Fermentation with a lactic starter culture is a well known cheese making step. Preferably, fermentation of the skim milk retentate proceeds to a level such that a coagulum does not form, i.e., the fermentation process is stopped while the pH is above the isoelectric point and preferably the pH is at a level of from about 4.8 to 5.0.

The method of the present invention requires the use of several mixing steps using particular types of mixers. The final fluid system of the present invention is a complex network of protein, both casein and serum protein, gums and a suitable bulking agent. The various components require introduction and mixing in a particular sequence and require particular mixing conditions to provide the highly desirable appearance, taste, consistency and texture of cream cheese resembling that of a fat-containing cream cheese, but containing substantially no fat.

Mixing is a common operation to effect distribution, intermingling and homogeneity of material. Actually, the operation is called agitation, with the term "mixing" being applicable when the goal is blending, that is providing a homogeneous material. Fluid motion, both large scale (bulk circulation) and small scale (turbulent eddys), is required in turbulent flow. The bulk circulation results when the fluid stream is discharged by an impeller. Turbulence is generated mostly by the velocity discontinuities adjacent to the stream of fluid flowing from the impeller, but also by boundary and from separation effects. Turbulence spreads throughout the bulk flow and, although even when attenuated, is carried to all parts of the vessel. Based upon the large variety of mixing apparatus available, it is recognized that some mixing operations should require relatively large bulk or mass flows, whereas others need a high intensity of turbulence, termed shear in this connection. In the method of the present invention, there is an optimum ratio of flow to shear during each of three mixing steps. Particular types of mixers are used for each of the three mixing operations.

As shown in FIG. 1, the concentrated skim milk is removed from holding tank 11 and is introduced into the first mixer 13. The first mixer 13 is provided with a scraped surface agitating means. The scraped surface agitator has blades which are in close contact with the interior surface of the mixing container. Such scraped surface mixers are well known by the term "Groen" kettle.

The concentrated skim milk is heated in the first mixer 13 as it is being agitated. The heating may be effected by any suitable method, such as by providing a heating jacket surrounding the first mixer 13. In a preferred heating method, the concentrated skim milk is recirculated through a first recirculating loop 14 through conduit 15 by means of pump 17. As the skim milk concentrate is being recirculated, the skim milk is heated to a first predetermined elevated temperature. Heating is preferably effected by means of steam injection through steam injector 19. An in-line mixer 21 is preferably provided in the recirculating line 15. The in-line mixer may be a static mixer such as described in U.S. Pat. No. 4,112,131 to Bosy, et al. Preferably, the in-line mixer is a turbine-type in-line mixer provided with impeller blades, such as is manufactured by the Scott Turbon Company and identified by the tradename Turbon TM. A suitable type of steam injection device is described in U.S. Pat. No. 4,112,131 to Bosy, et al.

During the period in which the concentrated skim milk is being recirculated and heated, an emulsifier salt is added to the first mixer 13. The emulsifier salt may be any of the salts normally used in the manufacture of processed cheese. Such emulsifier salts are usually sodium or potassium salts of an anion selected from the group consisting of citrate, phosphate and tartrate. The emulsifying salt for use in the present invention is preferably sodium citrate. The emulsifying salt is preferably added at a time prior to heating the skim milk above a temperature of about 100° F. The emulsifier salt is added at a level of from about 0.5% to about 1.5%, dry basis, based on the weight of the final cream cheese product.

The mixture of concentrated skim milk and emulsifier salt is heated to a temperature in the range of from about 130° F. to about 160° F.

The total time required for heating and mixing the concentrated skim milk in the first mixer 13 is in the range of from about 15 to about 30 minutes. After this time, a mixture has been formed which resembles a heated ricotta cheese in texture.

After being heated to the first predetermined temperature, the concentrated skim milk is transferred to second mixer 23. Second mixer 23 is a type which imparts high shear and is preferably a blender type mixer, such as is manufactured by Breddo Inc. and sold under the tradename Breddo. A Breddo mixer has a circular disc mounted on a rotating shaft. The circular disc is provided with a plurality of upstanding blades. The mixing action in the second mixer 23 is similar to that provided by a household blender.

After being transferred to second mixer 23, a gum is added to the heated concentrated skim milk. The gum or combination of gums employed at this point in the process may be selected from any of a number of commercially available dairy product gums. Typical useful gums are hydrocolloids, such as xanthan, carrageenan, guar gum, carob bean gum, alginic acid and sodium and calcium salts thereof, gum arabic, gum tragacanth, carboxymethyl cellulose, pectin, starches, modified starches and mixtures thereof.

The gum is added to the heated concentrated skim milk mixture immediately after introduction of the concentrated skim milk into second mixer 23. Agitation is commenced prior to addition of the gum and is continued for a period of from about 4 to about 6 minutes to provide a firm smooth doughy textured product. If mixing is less than about 4 minutes, the product exiting from second mixer 23 does not have the desirable creamy texture. If mixing takes place for more than about 6 minutes, the product tears apart and is not useful. The gum is preferably added to the second mixer at a level of from about 0.3% to about 1.5% dry weight, based on the final cream cheese product. The gum used in the second mixer 23 is preferably xanthan gum.

The product exiting from second mixer 23 is transferred by pump 27 through conduit 29 through a homogenizer 35 to third mixer 37.

Homogenization in the first homogenization step takes place at a pressure of from about 2000 to about 3000 psig, preferably 2500 psig. At higher homogenization pressures, a softer product is obtained and at lower homogenization pressures the product becomes too firm.

The homogenized, thickened concentrated skim milk is transferred through conduit 36 to third mixer 37. The third mixer 37 is preferably a type known as a Pfaudler mixer which uses a rotating multi-wire horizontally disposed beater at the bottom of the mixer. This type of mixer imparts medium shear such as the shear imparted by a household mixer using twin intermeshing whips to beat egg white into a stiff foam. The use of a high shear mixer at this point in the process would tear apart the gum/protein network that has been formed in the previous steps of the method.

After introduction of the thickened, concentrated skim milk into mixer 37, a suitable bulking agent and additional gum are added. Suitable bulking agents are those commonly used in the food industry, such as polydextrose, dextrins, non-fat dry milk solids, whey powder, buttermilk solids and corn syrup solids. Buttermilk solids and corn syrup solids are preferably used as the bulking agent. For reasons of flavor, the most preferable bulking agent is buttermilk solids. The corn syrup solids, when used, are preferably low DE corn syrup solids having a DE of from about 20 to about 36. Such low DE corn syrups have a very high viscosity and relatively low sweetness. The relatively low sweetness is the result of having low levels of reducing sugars, such as dextrose and maltose, and relatively high levels of non-reducing sugars, such as trisaccharides and higher saccharides. The bulking agent is added at a level of from about 1% to about 12%, dry basis, based on the weight of the final non-fat cream cheese product.

The gum may be any of the previously described dairy product gums. The gum is added at a level of from about 0.1% to about 2.0%. The gum added at this point in the process is preferably a mixture of carrageenan and guar gum which is added at a level of from about 0.05% to about 1.0% for each gum based on the weight of the non-fat cream cheese product.

The third mixer 37 is provided with a suitable heating means, such as a heating jacket or a second recirculating loop including pump 39, conduit 41 and steam injector 43. Preferably, the product is recirculated through the second recirculating loop as it is being heated by steam injection. The product is heated to a temperature in the range of from about 160° F. to about 180° F., preferably from about 165° F. to about 175° F. The product entering the third mixer 37 has a firm, smooth doughy texture. After mixing and heating in third mixer 37, the product has a fluid, creamy texture.

Additional ingredients may be added to the product in third mixer 37. Additional ingredients include a sweetening agent which can be natural or artificial, vitamins and minerals, flavorings and color. Also, during mixing in third mixer 37, if the pH of the product is above 5.3, the pH of the product is adjusted to within the range of from about 4.8 to about 5.3 by the addition of an edible acid. Any edible acid may be used such as sorbic acid, ascorbic acid, citric acid, lactic acid, gluconodelta lactone, hydrochloric acid and phosphoric acid. The acid is added to the product in mixer 37 at a level sufficient to adjust the pH to within the desired pH range of from about 4.8 to about 5.3.

After the product has been heated to the second predetermined temperature in the range of from about 160° F. to about 180° F., the product is subjected to a second homogenization step in homogenizer 45. The second homogenization step is conducted at a pressure in the range of from about 4000 psig to about 6000 psig, single stage, preferably about 5000 psig.

The cream cheese product resulting from homogenization may then be packaged, but is preferably subjected to a deaeration step in a vacuum deaerator 47 prior to packaging.

While the cream cheese product of the present invention is characterized as being a non-fat product, from a practical standpoint, it is impossible to remove all butterfat from milk in ordinary commercial cream separation processes. Usually, a few tenths of a percent of butterfat remains in the skim milk after separating cream from the milk in the most efficient separators, i.e., skim milk usually has from about 0.05% to about 0.3% of fat. When the skim milk is further concentrated, such as by providing a skim milk retentate or dry curd cottage cheese, the butterfat content is increased in proportion to the degree of concentration. Accordingly, the non-fat cream cheese product of the present invention has from about 0.05 to about 1.5% butterfat in the final cream cheese product.

The following example further illustrates various features of the present invention, but is intended to in no way limit the scope of the invention which is defined in the appended claims.

EXAMPLE 1

Skim milk is subjected to ultrafiltration treatment to provide a skim milk retentate having 26% solids. The skim milk retentate comprises 4.2% lactose, 19% protein, 2.0% ash, 0.24% fat and 0.12% salt. The skim milk retentate is subjected to high temperature, short time heat treatment to pasteurize the retentate. The retentate is then introduced into a fermentation tank and an *S. lactis* culture is added thereto along with 0.1% salt. The skim milk retentate (4000 gallons) is subjected to fermentation at a temperature of 78° F. for 16 hours. 1900 pounds of the fermented skim milk retentate is then introduced into first mixer 13. First mixer 13 is a Groen kettle. Dry curd cottage cheese, at a level of 2086 pounds is added to first mixer 13 and 50 pounds of sodium citrate are also added. The agitating means of first mixer 13 is turned on and the mixture is pumped through the first recirculating loop. Steam injection is commenced and the mixture of fermented retentate cottage cheese curd and sodium citrate are heated to a temperature of 145° F. Such heating takes place over a period of 15 to 30 minutes.

After being heated to a temperature of 145° F., the mixture is transferred to a second mixer, which is a Breddo mixer, and 27.5 pounds of xanthan gum are introduced into the heated mixture while the mixture is being agitated. The mixture is retained under agitating conditions in the Breddo mixer for a period of 5 minutes after addition of the xanthan gum. The mixture is then transferred to a surge tank 31 and is then homogenized at a pressure of 2500 psig in a Gaulin homogenizer.

The mixture is transferred to a third mixer, which is a Pfaudler mixer. Corn syrup solids having a DE of 24 at a level of 7.4%, salt at a level of 1.1%, sugar at a level of 0.6%, artificial color at a level of 0.001%, carrageenan at a level of 0.15%, guar at a level of 0.1%, sorbic acid at a level of 0.1%, Vitamin A and oleoresin paprika are added in the third mixer 37. The mixture has a pH of 5.0. The mixture is agitated and recirculated in third mixer 37 as it is being heated to a temperature of 170° F. The mixture from the third mixer 37 is then homogenized in second Gaulin homogenizer at a pressure of 5,000 psig. The homogenized mixture is then passed through a Versator TM deaerator manufactured by Cornell Machine Co., maintained at a pressure of −20 in. Hg. During passage through the deaerator, the mixture cools to a temperature of 165° F.

The product obtained after deaeration is then packaged and cooled. After cooling, the non-fat cream cheese type product of the invention has the appearance, taste, consistency and texture of cream cheese.

EXAMPLE 2

The process of Example 1 was repeated with the exception that buttermilk solids was substituted for the corn syrup solids. The buttermilk solids were used at a level of 4.0%, the fermented skim milk retentate was used at a level of 1759 pounds and the dry curd cottage cheese was used at a level of 2637 pounds.

The product obtained after deaeration, packaging and cooling has the appearance, taste, consistency and texture of cream cheese.

What is claimed is:

1. A method for making a non-fat cream cheese product comprising introducing a source of concentrated skim milk into a first mixer provided with agitation means, agitating said skim milk while heating said skim milk to a first predetermined temperature of from about 130° F. to about 160° F. during said agitation, adding an emulsifier salt to said skim milk while said skim milk is being agitated and heated, transferring said heated skim milk to a second mixer provided with agitation means, adding a first gum to said heated skim milk in said second mixer to provide a thickened skim milk, homogenizing said thickened skim milk in a first homogenizing step, transferring said homogenized skim milk to a third mixer provided with agitation means, adding a bulking agent and a second gum to said homogenized skim milk in said third mixer, agitating said homogenized skim milk in said third mixer while heating said skim milk to a second predetermined temperature of from about 160° F. to about 180° F. to provide a non-fat cream cheese precursor, homogenizing said non-fat cream cheese precursor in a second homogenizing step to provide a non-fat cream cheese product.

2. A method in accordance with claim 1 wherein said concentrated skim milk source is selected from the group consisting of a skim milk retentate, skim milk curd, evaporated skim milk, reconstituted dried skim milk and mixtures thereof.

3. A method in accordance with claim 2 wherein said concentrated skim milk source is a mixture of a skim milk retentate and cottage cheese curd.

4. A method in accordance with claim 3 wherein said skim milk retentate is fermented with a lactic acid culture prior to being introduced into said first mixer.

5. A method in accordance with claim 4 wherein said skim milk retentate is fermented to a pH of from about 4.8 to about 5.0.

6. A method in accordance with claim 1 wherein said agitation means of said first mixer is a scraped surface agitator.

7. A method in accordance with claim 3 wherein said mixture comprises from about 5% to about 95% by weight of said skim milk retentate.

8. A method in accordance with claim 1 wherein said heating to a first predetermined temperature is effected while pumping said skim milk through a recirculating loop back into said first mixer.

9. A method in accordance with claim 8 wherein said recirculating loop is provided with inline mixing means.

10. A method in accordance with claim 9 wherein said inline mixing means is a static mixer.

11. A method in accordance with claim 9 wherein said inline mixing means is a turbine mixer.

12. A method in accordance with claim 1 wherein said first predetermined temperature is from about 140° F. to about 150° F.

13. A method in accordance with claim 1 wherein said emulsifying salt is a sodium or potassium salt of an anion selected from the group consisting of citrate, phosphate and tartrate.

14. A method in accordance with claim 13 wherein said emulsifying salt is sodium citrate.

15. A method in accordance with claim 1 wherein said emulsifying salt is added to said skim milk prior to heating said skim milk above about 100° F.

16. A method in accordance with claim 1 wherein said first gum is selected from the group consisting of xanthan, guar gum, agar, carrageenan, gum arabic, gum tragacanth, alginates, locust bean gum, carboxymethyl cellulose, pectin, starches, modified starches and mixtures thereof.

17. A method in accordance with claim 1 wherein said second mixer is a blender type mixer.

18. A method in accordance with claim 1 wherein mixing in said second mixer is for a period of from about 4 minutes to about 6 minutes after addition of said gum.

19. A method in accordance with claim 16 wherein said gum is xanthan gum.

20. A method in accordance with claim 1 wherein said first homogenizing step is at a pressure of from about 2000 psig to about 3000 psig single stage.

21. A method in accordance with claim 1 wherein said third mixer is a medium shear whip type mixer.

22. A method in accordance with claim 1 wherein mixing in said third mixer is for a period of from about 10 to about 20 minutes after addition of said bulking agent and said gum.

23. A method in accordance with claim 1 wherein said bulking agent is selected from the group consisting of polydextrose, dextrins, non-fat dry milk solids, whey powder, buttermilk solids, corn syrup solids and mixtures thereof.

24. A method in accordance with claim 23 wherein said bulking agent is buttermilk solids.

25. A method in accordance with claim 23 wherein said bulking agent is corn syrup solids having a DE of from about 20 to about 36.

26. A method in accordance with claim 1 wherein said bulking agent is added at a level of from about 1 percent to about 12 percent by weight dry basis, based on the weight of the cream cheese product.

27. A method in accordance with claim 1 wherein said second gum is selected from the group consisting of xanthan, guar gum, agar, carrageenan, gum arabic, gum tragacanth, alginates, locust bean gum, carboxymethyl cellulose, pectins, starches, modified starches and mixtures thereof.

28. A method in accordance with claim 27 wherein said second gum is a mixture of carrageenan and guar gum.

29. A method in accordance with claim 1 wherein said first gum is added at a level of from about 0.3% to about 1.5%.

30. A method in accordance with claim 1 wherein said second gum is added at a level of from about 0.1% to about 2.0%.

31. A method in accordance with claim 26 wherein said carrageenan and said guar gum are each added at a level of from about 0.05% to about 1.0%.

32. A method in accordance with claim 1 wherein a sweetener is also added to said third mixer.

33. A method in accordance with claim 32 wherein said sweetener is sugar which is added at a level of from about 0.3% to about 1.5%.

34. A method in accordance with claim 1 wherein the pH of said cream cheese product is adjusted to within the range of from about 4.8 to about 5.3 by the addition of an edible acid to said homogenized, thickened skim milk in said third mixer.

35. A method in accordance with claim 34 wherein said edible acid is selected from the group consisting of sorbic acid, ascorbic acid, citric acid, lactic acid gluconodelta lactone, hydrochloric acid and phosphoric acid.

36. A method in accordance with claim 35 wherein said edible acid is sorbic acid.

37. A method in accordance with claim 1 wherein said heating to said second predetermined temperature is effected while pumping said homogenized, thickened skim milk through a recirculating loop back into said third mixer.

38. A method in accordance with claim 1 wherein said second predetermined temperature is from about 165° F. to about 175° F.

39. A method in accordance with claim 1 wherein said first and said second predetermined elevated temperatures are attained by steam injection.

40. A method in accordance to claim 1 wherein said second homogenizing step is at a pressure of from about 4000 psig to about 6000 psig single stage.

41. A method in accordance with claim 1 wherein said cream cheese product is deaerated after said second homogenizing step by subjecting said cream cheese product to a vacuum.

42. A method in accordance with claim 41 wherein said deaeration takes place while said cream cheese product is above a temperature of about 150° F.

43. A method for making a non-fat cream cheese product comprising
providing a skim milk retentate,
introducing said retentate and dry cottage cheese curd into a first mixer provided with agitation means to provide a concentrated skim milk source,
agitating said skim milk source as the skim milk is heated to a first predetermined temperature of from about 130° F. to about 160° F.,
adding an emulsifier salt to said skim milk while said skim milk is being agitated and heated,
transferring said heated skim milk to a second mixer provided with agitation means,
adding a first gum to said heated skim milk in said second mixer to provide a thickened skim milk,
homogenizing said thickened skim milk in a first homogenizing step,
transferring said homogenized skim milk to a third mixer provided with agitation means,
adding a bulking agent and a second gum to said homogenized skim milk in said third mixer,
agitating said homogenized skim milk in said third mixer while heating said skim milk to a second predetermined temperature of from about 160° F.

to about 180° F. to provide a non-fat cream cheese precursor, homogenizing said non-fat cream cheese precursor in a second homogenizing step to provide a non-fat cream cheese product.

44. A method in accordance with claim 43 wherein said skim milk retentate is fermented with a lactic acid culture prior to being introduced into said first mixer.

45. A method in accordance with claim 44 wherein said skim milk retentate is fermented to a pH of from about 4.8 to about 5.0.

46. A method in accordance with claim 43 wherein said agitation means of said first mixer is a scraped surface agitator.

47. A method in accordance with claim 43 wherein said skim milk retentate comprises from about 5% to about 95% by weight of said non-fat cream-cheese product.

48. A method in accordance with claim 43 wherein said heating to said first predetermined temperature is effected while pumping said skim milk through a recirculating loop back into said first mixer.

49. A method in accordance with claim 48 wherein said recirculating loop is provided with inline mixing means.

50. A method in accordance with claim 49 wherein inline mixing means is a static mixer.

51. A method in accordance with claim 49 wherein said inline mixing means is a turbo mixer.

52. A method in accordance with claim 43 wherein said first predetermined temperature is from about 140° F. to about 150° F.

53. A method in accordance with claim 43 wherein said emulsifying salt is a sodium or potassium salt of an anion selected from the group consisting of citrate, phosphate and tartrate.

54. A method in accordance with claim 53 wherein said emulsifying salt is sodium citrate.

55. A method in accordance with claim 43 wherein said emulsifying salt is added to said skim milk prior to heating said skim milk above about 100° F.

56. A method in accordance with claim 43 wherein said first gum is selected from the group consisting of xanthan, guar gum, agar carrageenan, gum arabic, gum tragacanth, alginates, locust bean gum, carboxymethyl cellulose, pectin, starches, modified starches and mixtures thereof.

57. A method in accordance with claim 43 wherein said second mixer is a blender type mixer.

58. A method in accordance with claim 43 wherein mixing in said second mixer is for a period of from about 4 minutes to about 6 minutes after addition of said gum.

59. A method in accordance with claim 56 wherein said gum is xanthan gum.

60. A method in accordance with claim 43 wherein said first homogenizing step is at a pressure of from about 2000 psig to about 3000 psig single stage.

61. A method in accordance with claim 43 wherein said third mixer is a medium shear whip type mixer.

62. A method in accordance with claim 43 wherein mixing in said third mixer is for a period of from about 10 to about 20 minutes after addition of said bulking agent and said gum.

63. A method in accordance with claim 43 wherein said bulking is selected from the group consisting of polydextrose, dextrins, non-fat dry milk solids, whey powder, buttermilk solids, corn syrup solids and mixtures thereof.

64. A method in accordance with claim 63 wherein said bulking agent is buttermilk solids.

65. A method in accordance with claim 63 wherein said bulking agent is corn syrup solids having a DE of from about 20 to about 36.

66. A method in accordance with claim 43 wherein said bulking agent is added at a level of from about 1 percent to about 12 percent by weight dry basis, based on the weight of the cream cheese product.

67. A method in accordance with claim 43 wherein said second gum is selected from the group consisting of xanthan, guar gum, agar, carrageenan, gum arabic, gum tragacanth, alginates, locust bean gum, carboxymethyl cellulose, pectins, starches, modified starches and mixtures thereof.

68. A method in accordance with claim 67 wherein said second gum is a mixture of carrageenan and guar gum.

69. A method in accordance with claim 43 wherein said first gum is added at a level of from about 0.3% to about 1.5%.

70. A method in accordance with claim 43 wherein said second gum is added at a level of from about 0.1% to about 2.0%.

71. A method in accordance with claim 68 wherein said carrageenan and said guar gum are each added at a level of from about 0.05% to about 1.0%.

72. A method in accordance with claim 43 wherein a sweetener is also added to said third mixer.

73. A method in accordance with claim 72 wherein said sweetener is sugar which is added at a level of from about 0.3% to about 1.5%.

74. A method in accordance with claim 43 wherein the pH of said cream cheese type product is adjusted to within the range of from about 4.8 to about 5.3 by the addition of an edible acid to said homogenized, thickened skim milk in said third mixer.

75. A method in accordance with claim 74 wherein said edible acid is selected from the group consisting of sorbic acid, ascorbic acid, citric acid, lactic acid, gluconodelta lactone, hydrochloric acid and phosphoric acid.

76. A method in accordance with claim 74 wherein said edible acid is sorbic acid.

77. A method in accordance with claim 43 wherein said heating to said second predetermined temperature is effected while pumping said homogenized, thickened skim milk through a recirculating loop back into said third mixer.

78. A method in accordance with claim 77 wherein said second predetermined temperature is from about 165° F. to about 175° F.

79. A method in accordance with claim 43 wherein said first and said second predetermined elevated temperatures are attained by steam injection.

80. A method in accordance to claim 43 wherein said second homogenizing step is at a pressure of from about 4000 psig to about 6000 psig single stage.

81. A method in accordance with claim 43 wherein said cream cheese product is deaerated after said second homogenizing step by subjecting said cream cheese product to a vacuum.

82. A method in accordance with claim 81 wherein said deaeration takes place while said cream cheese product is above a temperature of about 150° F.

* * * * *